US008645847B2

(12) United States Patent
Boss et al.

(10) Patent No.: US 8,645,847 B2
(45) Date of Patent: Feb. 4, 2014

(54) SECURITY ENHANCEMENTS FOR IMMERSIVE ENVIRONMENTS

(75) Inventors: Gregory J. Boss, Saginaw, MI (US); Rick A. Hamilton, II, Charlottesville, VA (US); Neil A. Katz, Parkland, FL (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 13/172,947

(22) Filed: Jun. 30, 2011

(65) Prior Publication Data
US 2013/0007636 A1    Jan. 3, 2013

(51) Int. Cl.
G06F 3/048 (2013.01)
G06F 3/00 (2006.01)

(52) U.S. Cl.
USPC ........... 715/757; 715/751; 715/753; 715/848; 715/850; 715/852

(58) Field of Classification Search
USPC .................. 715/751, 753, 757, 848, 850, 852
See application file for complete search history.

(56) References Cited

U.S. PATENT DOCUMENTS

| 6,240,421 | B1 * | 5/2001 | Stolarz ................................... 1/1 |
| 7,788,323 | B2 * | 8/2010 | Greenstein et al. ........... 709/204 |
| 2008/0215994 | A1 * | 9/2008 | Harrison et al. .............. 715/757 |
| 2009/0049513 | A1 * | 2/2009 | Root et al. ........................ 726/1 |
| 2009/0069084 | A1 * | 3/2009 | Reece et al. .................... 463/32 |
| 2010/0060649 | A1 | 3/2010 | Haggar et al. |
| 2010/0064253 | A1 | 3/2010 | Bates et al. |
| 2010/0076970 | A1 | 3/2010 | Bates et al. |
| 2010/0082798 | A1 | 4/2010 | Bhogal et al. |
| 2010/0083138 | A1 | 4/2010 | Dawson et al. |
| 2010/0251337 | A1 * | 9/2010 | Amsterdam et al. .............. 726/4 |
| 2011/0055728 | A1 * | 3/2011 | Dawson et al. ............... 715/753 |
| 2011/0055927 | A1 | 3/2011 | Hamilton, II et al. |
| 2011/0209198 | A1 * | 8/2011 | Blattner et al. .................... 726/3 |
| 2011/0219084 | A1 * | 9/2011 | Borra et al. .................... 709/206 |
| 2012/0219935 | A1 * | 8/2012 | Stebbings et al. ............ 434/262 |

FOREIGN PATENT DOCUMENTS

KR    100895199    4/2009

OTHER PUBLICATIONS

Wikipedia, , "Universally unique identifier", http://en.wikipedia.org/wiki/UUID (Obtained from the Internet on Jun. 29, 2011) 1996 , 8 pages.

* cited by examiner

Primary Examiner — Nicholas Augustine
(74) Attorney, Agent, or Firm — DeLizio Gilliam, PLLC

(57) ABSTRACT

In some example embodiments, a method includes defining a tracking area for a first avatar in an online immersive environment, wherein the tracking area encompasses the first avatar and some defined area beyond the first avatar. The first avatar represents a first person who is a guardian of a second person in the real world and external to the online immersive environment. A second avatar represents the second person in the online immersive environment. The method includes tracking a path through the online immersive environment of the tracking area for the first avatar. The method includes marking a region in the online immersive environment as a safe zone for the second avatar, after the path of the tracking area for the first avatar has traversed the region. The method includes authorizing access to the region marked as the safe zone for the second avatar in the online immersive environment.

24 Claims, 5 Drawing Sheets

SECURITY ENHANCEMENTS FOR IMMERSIVE ENVIRONMENTS

BACKGROUND

Embodiments of the inventive subject matter generally relate to the field of computing, and, more particularly, to security enhancements for immersive environments.

Examples of an online immersive environment can include online gaming (e.g., Role Playing Games (RPGs), virtual universes, etc.). Example online immersive environments can include computer-based simulated environments for its residents to traverse, inhabit, and interact through the use of avatars. Many online immersive environments are represented using three-dimensional graphics and landscapes. Also, these online immersive environments can be populated by many thousands of users, known as "residents." Often, online immersive environments can resemble the real world such as in terms of physics, houses, landscapes, etc.

SUMMARY

In some example embodiments, a method includes defining a tracking area for a first avatar in an online immersive environment, wherein the tracking area encompasses the first avatar and some defined area beyond the first avatar. The first avatar represents a first person who is a guardian of a second person external to the online immersive environment. A second avatar represents the second person in the online immersive environment. The method includes tracking a path through the online immersive environment of the tracking area for the first avatar. The method includes marking a region in the online immersive environment as a safe zone for the second avatar, after the path of the tracking area for the first avatar has traversed the region. The method includes authorizing access to the region marked as the safe zone for the second avatar in the online immersive environment.

In some example embodiments, a computer program product for creating authorized regions in an online immersive environment includes a computer readable storage medium having computer usable program code embodied therewith. The computer usable program code comprises a computer usable program code configured to define a tracking sphere for a first avatar in the online immersive environment, wherein the tracking sphere encompasses the first avatar and some defined area beyond the first avatar. The first avatar represents a first person who is a guardian of a second person that is a minor in the real world and external to the online immersive environment. A second avatar represents the second person in the online immersive environment. The computer usable program code is configured to track a path through the online immersive environment of the tracking sphere for the first avatar. The computer usable program code is configured to mark a region in the online immersive environment as a safe zone for the second avatar, after the path of the tracking sphere for the first avatar has traversed the region. The computer usable program code is configured to authorize access to the region marked as the safe zone for the second avatar in the online immersive environment. The computer usable program code is configured to determine a rate of change of at least one permanent change of the region that was marked. The computer usable program code is configured to determine that the rate of change of the at least one permanent change of the region has been exceeded for a time period. The computer usable program code is configured to responsive to a determination that the rate of change of the at least one permanent change of the region has been exceeded for the time period, notify the first avatar of the at least one permanent change of the region.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
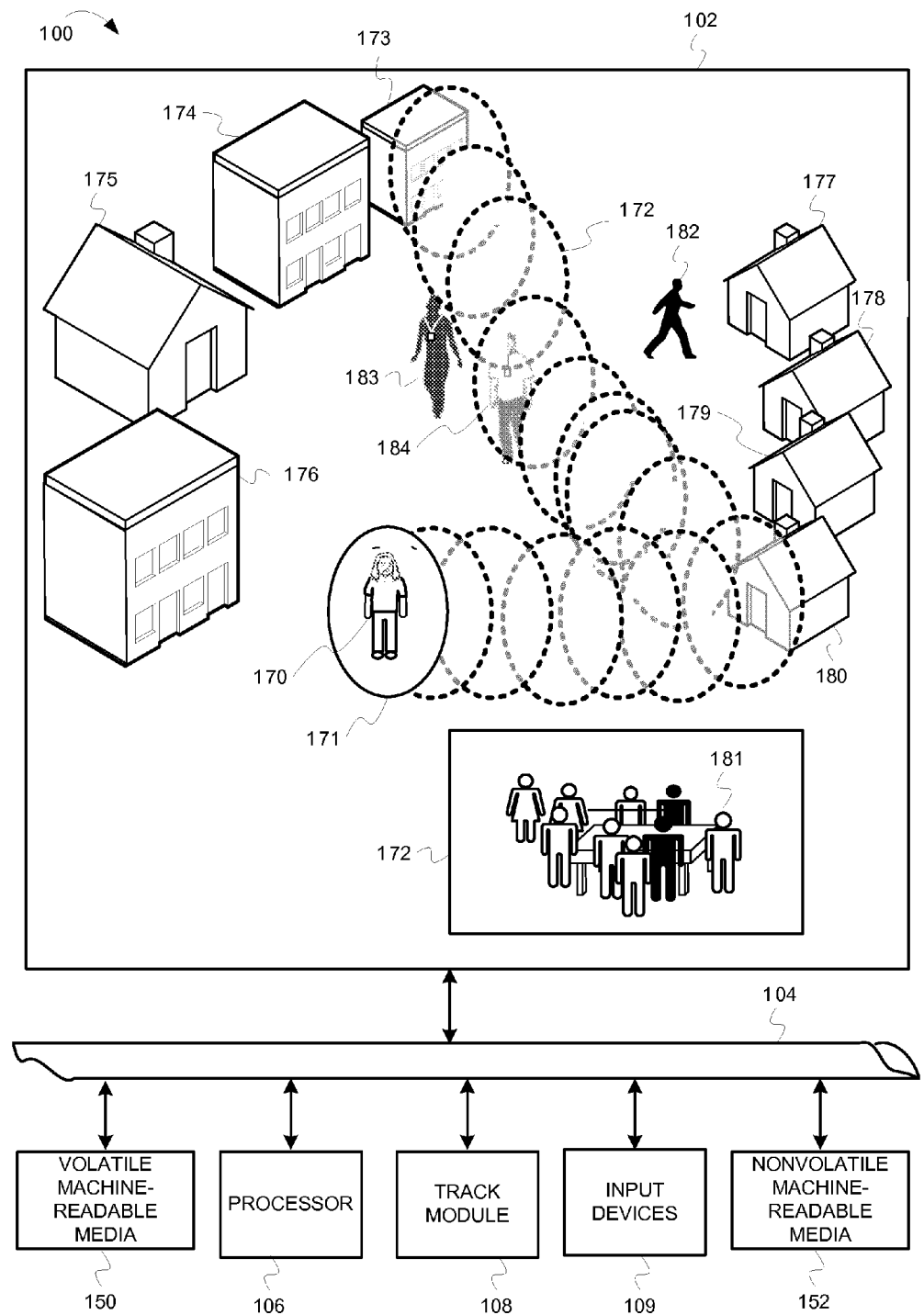
FIG. 1 depicts a system for providing child safety in an online immersive environment, according to some example embodiments.

The description that follows includes exemplary systems, methods, techniques, instruction sequences and computer program products that embody techniques of the present inventive subject matter. However, it is understood that the described embodiments may be practiced without these specific details. For instance, although examples refer to a parent limiting exposure by a child to a virtual universe, some example embodiments are applicable to any two persons of varying relationships. In other instances, well-known instruction instances, protocols, structures and techniques have not been shown in detail in order not to obfuscate the description.

Some example embodiments enable a parent or guardian (hereinafter parent will refer to parent or guardian) to limit exposure of a child or dependent (hereinafter child will refer to child or dependent) to an online immersive environment. An online immersive environment can include any computing situation wherein users interact with one another over any type of network (e.g., Internet, Local Area Network (LAN), etc.) using characters, avatars, etc. Examples of an online immersive environment include Role Playing Games (RPGs), virtual universes, etc. Also, while described relative to an online immersive environment, some example embodiments can have application to online web browsing.

A child can be limited relative to regions, objects, etc. of an online immersive environment. Conventional techniques are not sufficient to enable children to safely explore an online immersive environment. In particular, conventional techniques do not give a parent sufficient detailed control over a child's exploration in an online immersive environment. Online immersive environments include vast spaces and because they constantly change are not conducive to either automatic censorship or manual censorship performed by a third party service. In a matter of minutes a relatively safe and mild place can turn into an entirely different experience. For example, a group of avatars dressed inappropriately, engaged in inappropriate activities and speaking undesirable language can infiltrate a virtual region very quickly. If a child-operated avatar was in such a place there is no means for protection. Some example embodiments provide methods needed for parent's to ensure a children's online immersive environment experience is safe.

In some example embodiments, the account of the parent is linked to an account of the child. As the parent explores and visits various regions and areas within the online immersive environment, those regions and areas can be unlocked for access by the child's account that is linked thereto. Also, if the parent finds specific objects, avatars, parts of a region, etc. not suitable for the child, the parent can explicitly mark such items as inaccessible by the child.

Accordingly, some example embodiments provide for implicit unlocking of regions by a parent based on a recorded account of the parent's own visited regions. Also, there can be low-level lockout control of objects within those regions to provide detailed control of the regions. Some example embodiments can provide optional, automatic exclusions of new objects within regions visited by the parent. In some example embodiments, an intersecting tracing sphere along a path visited by the parent can be used to enable automatic tagging of a safe zone as defined by the tracing sphere.

Some example embodiments mark a safe zone for a child based on a tracing sphere that is defined by some x, y, and z dimension that encapsulates the parent's avatar. In such embodiments, a safe zone is defined by whatever the tracing sphere touches. The tracing sphere can change size and shape as needed depending on the environment. For example, in a crowded city, the tracing sphere can shrink so that the safe zone is defined by a finer granularity. To illustrate, assume that the parent is walking through a video store that has an adult section in the online immersive environment. In such a situation, the tracing sphere can be configured to be smaller to ensure that the safe zone does not include the entire video store that includes the adult section. In another example, the parent can be walking through a park in the online immersive environment. In this situation, the tracing sphere can be configured to be expanded (e.g., hundreds of feet), thereby defining a greater area of a safe zone for a given traversal by the parent in the online immersive environment. A path in the online immersive environment can be defined by a collection of points or a vector. A child is allowed to walk a same relative path as the parent—not necessarily a constrained path. Otherwise, with a constrained path, the child's experience would be an instant replay of the parent's experience, rather than an immersive experience. In some example embodiments, the configurability of the size and shape of the tracing sphere can be performed by the parent and/or automatically based on the environment. For example, the size and shape of the tracking sphere can decrease, become thinner, etc. as the population density, building density, etc. increases. Similarly, the size and shape of the tracing sphere can increase, become wider or longer, etc. as the population density, building density, etc. decreases.

Some example embodiments enable a parent to explicitly remove items from a trace or path that the parent has traversed in the online immersive environment. For example, a parent can visit a region that contains a small amount of content that they don't want their child to experience but that was part of a safe zone that the parent visited. The parent can mark an object as unsafe, thereby preventing the child from experiencing the particular object while still allowing the child to experience the traversed region or path.

While a parent can automatically unlock regions as they move throughout the online immersive environment, a parent can relock any unlocked region if they deem such region, object, area, automated avatar, etc. unsuitable for the child. Also, augmentations can be needed to rendering and transportation systems available in the online immersive environment. In particular, teleporting from one region to a different region by a child can be constrained based on the defined unlocked regions by the parent. Some example embodiments verify that a region where a child is teleporting to is unlocked by the parent prior to allowing the child to teleport to this region. Additionally, for each object or automated avatar within a viewable region for the child, an additional lookup can be performed to determine if the object or automated avatar has been unlocked by the parent account. In such a configuration, if the object or automated avatar is not unlocked, it will not be viewable by the child. This precludes new objects or automated avatars that are not authorized by the parent from entering a region that has been unlocked.

In some example embodiments, the parent is notified when permanent or substantive changes are made to unlocked regions. A permanent change can be defined as any change that remains more than a defined period (e.g., four hours, one day, one week, one month, etc.). For example, if an area is converted from a park to a night club, the change can be considered permanent. In some example embodiments, a parent can be notified of any permanent change within an unlocked region. A parent can also be notified after N number of changes for a defined time period. For example, five permanent changes over a four day period would result in a notification to the parent on the fifth day. In some other example embodiments, a parent is notified if a rate of standard change of the permanent changes exceeds a threshold. The standard rate of change of permanent changes can be measured to establish a baseline of change within that region. If the number of permanent changes exceed that baseline, the parent can be notified, thereby allowing the parent to lock the region until visited, allow the region to remain unlocked, etc. For example, if a region has a baseline of two changes per day, those changes may be of little consequence to the feel or theme or a region and can be ignored. However, if one day 100 changes are made, a notification can be sent to the parent.

In some example embodiments, notification of change to the parent can be based on the importance of the object that was changed. For example, interactions with objects, such as viewing, moving, inspecting, etc. are measured. An object can be considered more important the more interactions that occur for the object. In some example embodiments, a parent can be notified if an object (in an unlocked region) whose interactions exceed a threshold for a given time period changes. Also, a parent can be notified of any new object for an unlocked region. For example, if a picture on a wall is modified and there is little interaction with the picture, a notification is not sent. However, if a region contains a movie theater and the owner changes the image from a television to a projector system and there are many interactions occur relative to the movie theater, the parent is notified.

One avatar can perform permanent changes to different objects across multiple regions. In some example embodiments, a parent can be notified of other regions where permanent changes have occurred if the permanent changes were made by a same avatar that created a permanent change a current object in a current region that cause the parent to affect a change in authorization to the current object or current region. For example, assume that avatar A creates a permanent change to object A in region A. Assume that the parent is notified of this permanent change and in response changes access to object A or region A to prevent a child from accessing. In some example embodiments, the parent is also notified of some or all other regions where avatar A has created a permanent change to an object. This allows the parent to block access to other objects or regions based on the activity of the same avatar who created a permanent change to a current object in a current region, which cause the parent to block access to the current object or current region.

In some example embodiments, the authorized regions and objects by different parents are compared and used for authorizing regions and objects for a child. In particular, safety selections for authorized regions and objects can be compared among guardians. These selections by one parent can be used by a different parent if their selections exceed a threshold. For example, assume that the authorized regions for parent A and parent B overlap by at least 95%. In response, the linked child for parent B can use the authorized regions and objects authorized by parent A. Similarly, the linked child for parent A can use the authorized regions and objects authorize by parent B. Such embodiments can allow current and future authorized regions and objects to be used by this child even though the authorization is not specifically from the linked parent.

Also, while described relative to an online immersive environment, some example embodiments can be applied to online web browsing. A parent can trace a path through their web browsing. Elements, pages, etc. can be unlocked for child access based on the path of the parent. This can be a white list function with a predefined gray zone, where the gray zone is created at the outer edges of the pages browsed. For example, a parent can turn on the tracing. Web pages that were explicitly traversed by the parent can be considered a part of the white list and available to the child. The gray list can include X number of pages linked from the pages visited. For example, assume that website A is on the white list (because it was visited by the parent). Any hyperlinks on website A would be a part of the gray list and also accessible by the child. The parent can also define how many links from website A can be considered part of the gray list (e.g., one, three, etc.).

FIG. 1 depicts a system for providing child safety in an online immersive environment, according to some example embodiments. FIG. 1 depicts system 100 that includes screen 102, processor 106, track module 108, input devices 109, volatile machine-readable media 150, and nonvolatile machine-readable media 152 that are communicatively coupled together through bus 104. FIG. 1 can represent any type of computing device (e.g., a desktop computer, laptop computer, mobile device, etc.). Also the components of FIG. 1 can be in a single device or distributed across two or more devices.

Processor 106 can be one processor or possibly multiple processors, multiple cores, multiple nodes, and/or implementing multi-threading, etc. Volatile machine-readable media 150 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Although illustrated as being coupled to bus 104, volatile machine-readable media 150 may be directly coupled to processor 106. Nonvolatile machine-readable media 152 can include optical storage, magnetic storage, etc. Input device(s) 114 can include a touchscreen of the screen 102, a keyboard, mouse, microphone, etc. System 100 can include other components not shown in FIG. 1. For example, system 100 can include a network interface (e.g., an ATM interface, an Ethernet interface, a Frame Relay interface, SONET interface, wireless interface, etc.).

Track module 108 can be software, firmware, hardware or a combination thereof. For example, track module 108 can be software that is loaded into processor 106 for execution therein. As further described below, track module 108 can track the paths of an avatar that is a parent whose account is linked to an account of their child. The track module 108 can track a tracking sphere of the parent's avatar that encompasses the parent's avatar.

In some example embodiments, the account of the parent is linked to an account of the child. As the parent explores and visits various regions within the online immersive environment, track module 108 can store these regions in nonvolatile machine-readable media 152. In some example embodiments, the parent configures their account to turn on and off the option for tracking by track module 108. Also, track module 108 can receive input from the parent to exclude specific objects, avatars, parts of a region, etc. that are in a region authorized by the tracking sphere of the parent.

To illustrate, screen 102 includes a display of parts of an online immersive environment. The display includes a number of buildings—building 160, building 173, building 174, building 175, building 176, building 177, building 178, building 179, and building 180. Building 160 houses group of people 181. Display also includes avatar 170, avatar 182, avatar 183, and avatar 184. In this example, avatar 170 is representative of a parent's account of that is linked to a child's account having its own avatar (not shown in FIG. 1). Tracing sphere 171 encompasses avatar 170. A safe zone for the child is based on tracing sphere 171 that is defined by some x, y, and z dimension that encapsulates the parent's avatar. In such embodiments, a safe zone is defined by whatever tracing sphere 171 touches. The display also shows a history of the movement 172 of tracing sphere 171. As shown, tracing sphere 171 touched building 173, avatar 184 and building 180. Accordingly, this history of the movement 172 has created a region that is considered a safe zone which the child's avatar can enter (including building 173 and building 180).

Tracing sphere 171 can change size and shape as needed depending on the environment. For example, in a crowded city, tracing sphere 171 can shrink so that the safe zone is defined by a finer granularity. To illustrate, assume that the parent is walking through a video store that has an adult section in the online immersive environment. In such a situation, tracing sphere 171 can be configured to be smaller to ensure that the safe zone does not include the entire video store that includes the adult section. In another example, the parent can be walking through a park in the online immersive environment. In this situation, tracing sphere 171 can be configured to be expanded (e.g., hundreds of feet), thereby defining a greater area of a safe zone for a given traversal by the parent in the online immersive environment. A path in the online immersive environment can be defined by a collection of points or a vector. A child is allowed to walk a same relative path as the parent—not necessarily a constrained path. Otherwise, with a constrained path, the child's experience would be an instant replay of the parent's experience, rather than an immersive experience. In some example embodiments, the configurability of the size and shape of tracing sphere 171 can be performed by the parent and/or automatically based on the environment. For example, the size and shape of the tracing sphere 171 can decrease, become thinner, etc. as the population density, building density, etc. increases. Similarly, the size and shape of tracing sphere 171 can increase, become wider or longer, etc. as the population density, building density, etc. decreases.

Some example embodiments enable a parent to explicitly remove items from a trace or path that the parent has traversed in the online immersive environment. For example with reference to FIG. 1, the parent can exclude a room, item, etc. within building 180. The parent can mark an object as unsafe, thereby preventing the child from experiencing the particular object while still allowing the child to experience the traversed region or path. Therefore, the child's avatar can still enter building 180 but is excluded from experience the exclude room, object, etc.

A parent can relock a region they previously unlocked. Accordingly, track module 108 can relock any unlocked region if the parent inputs an instruction to do so. Some online immersive environments are configured to enable teleporting from one region to another region. In some example embodiments, track module 108 can verify that a child's avatar is authorized to experience a region prior to allowing teleporting into the region. Additionally, for each object or automated avatar within a viewable region for the child, track module 108 can perform an additional lookup to determine if the object or automated avatar has been unlocked by the parent account. In such a configuration, if the object or automated avatar is not unlocked, it will not be viewable by the child. This precludes new objects or automated avatars that are not authorized by the parent from entering a region that has been unlocked.

In some example embodiments, track module 108 notifies the parent when permanent or substantive changes are made to unlocked regions. A permanent change can be defined as any change that remains more than a defined period (e.g., four hours, one day, one week, one month, etc.). The parent can then change access to the region or objects therein based on these permanent changes. One avatar can perform permanent changes to different objects across multiple regions. In some example embodiments, track module 108 can notify the parent of other regions where permanent changes have occurred if the permanent changes were made by a same avatar that created a permanent change a current object in a current region that cause the parent to affect a change in authorization to the current object or current region.

To better illustrate, flowcharts of the operations of track module 108 are now described. Also, a screenshots illustrating authorized regions for a child avatar defined by a tracking sphere of the parent avatar is also described in conjunction with the description of the flowcharts.

Figure 2:
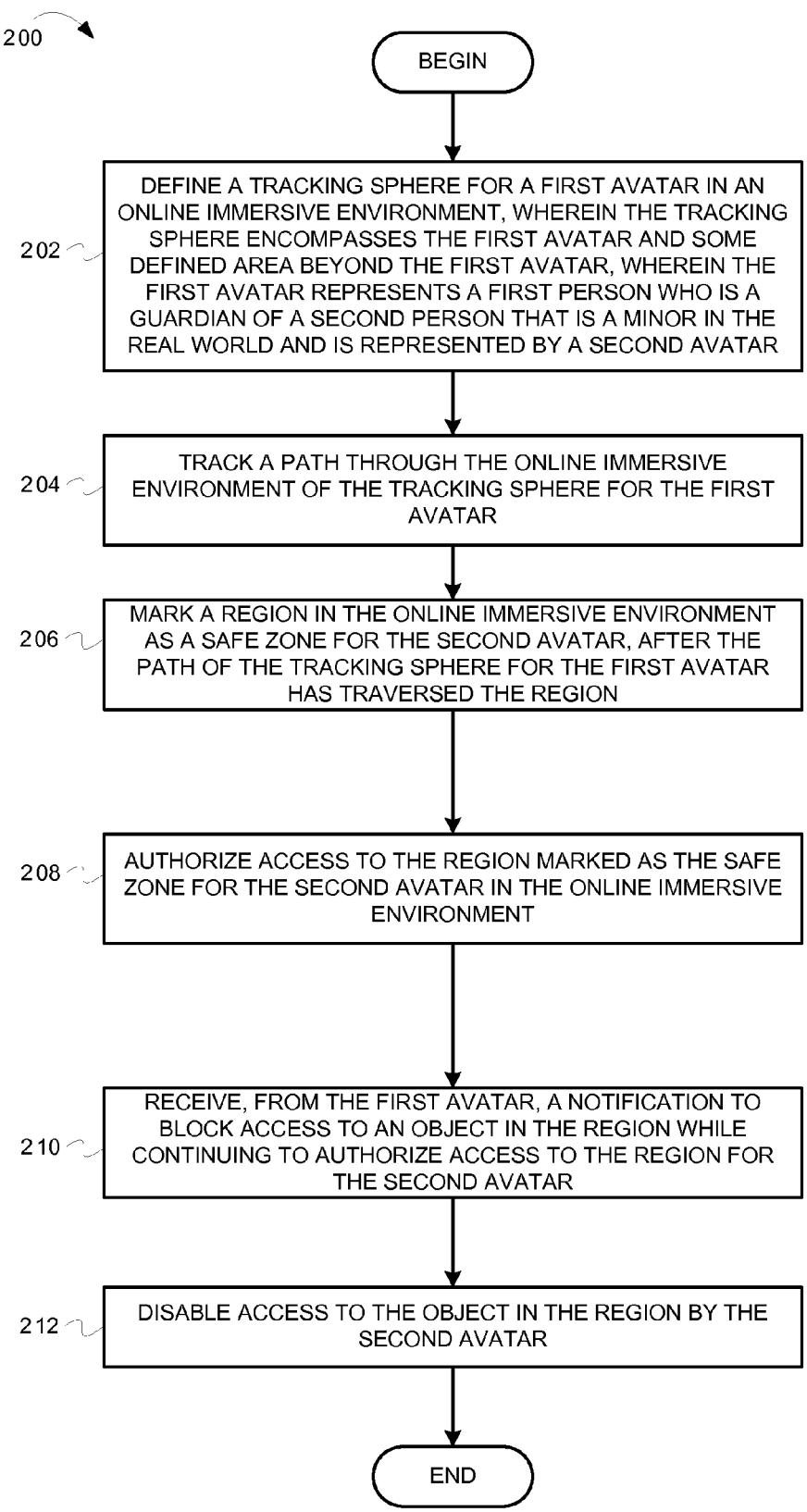
FIG. 2 depicts a flowchart for providing child safety in an online immersive environment, according to some example embodiments.
Figure 3:
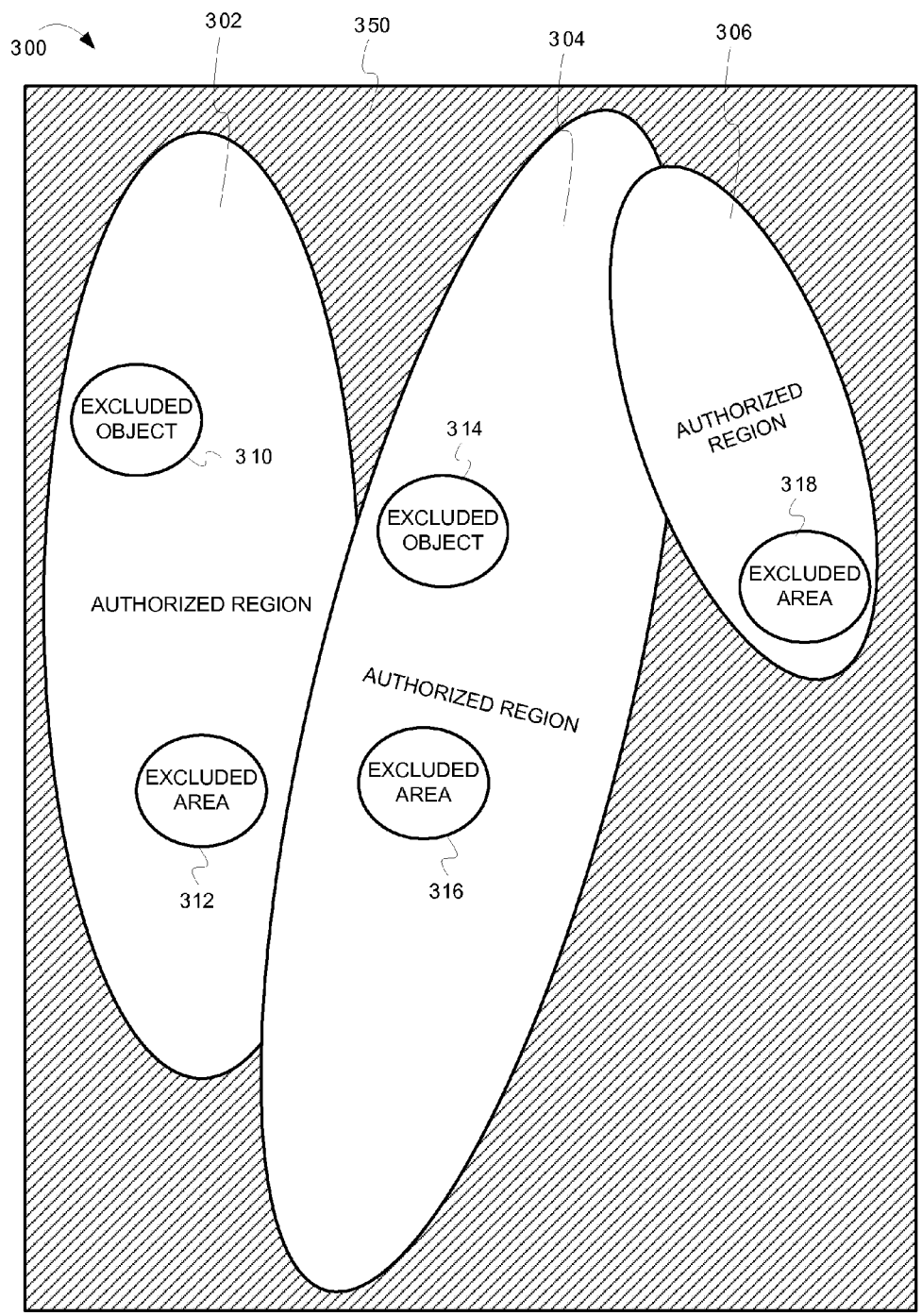
FIG. 3 depicts a screenshot of an example part of an online immersive environment having authorized and unauthorized regions based on a tracing sphere of the parent's avatar, according to some example embodiments.
Figure 4:
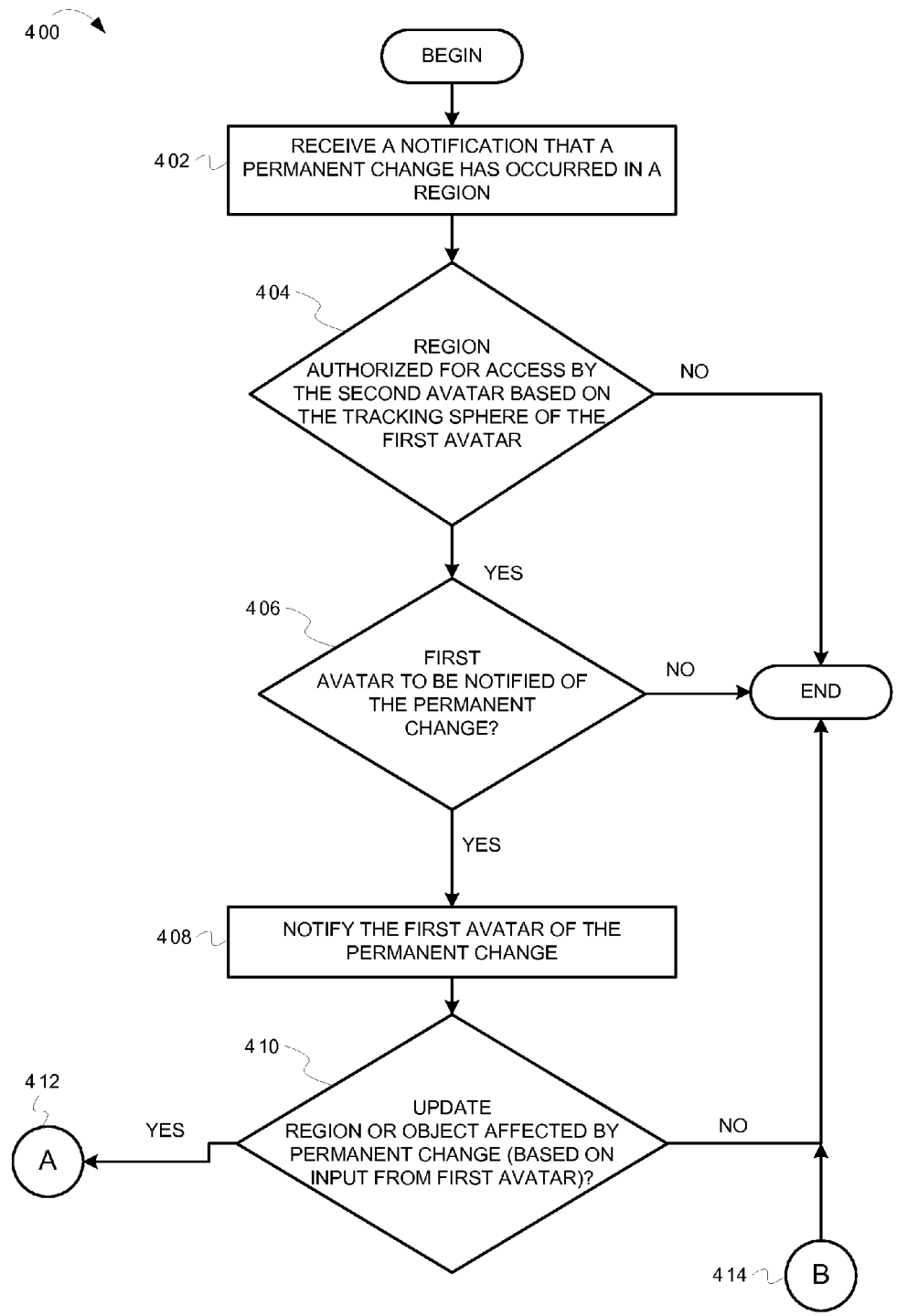
FIGS. 4-5 depict flowcharts for notification to the parent's account of permanent changes to authorized regions, according to some example embodiments.
Figure 5:
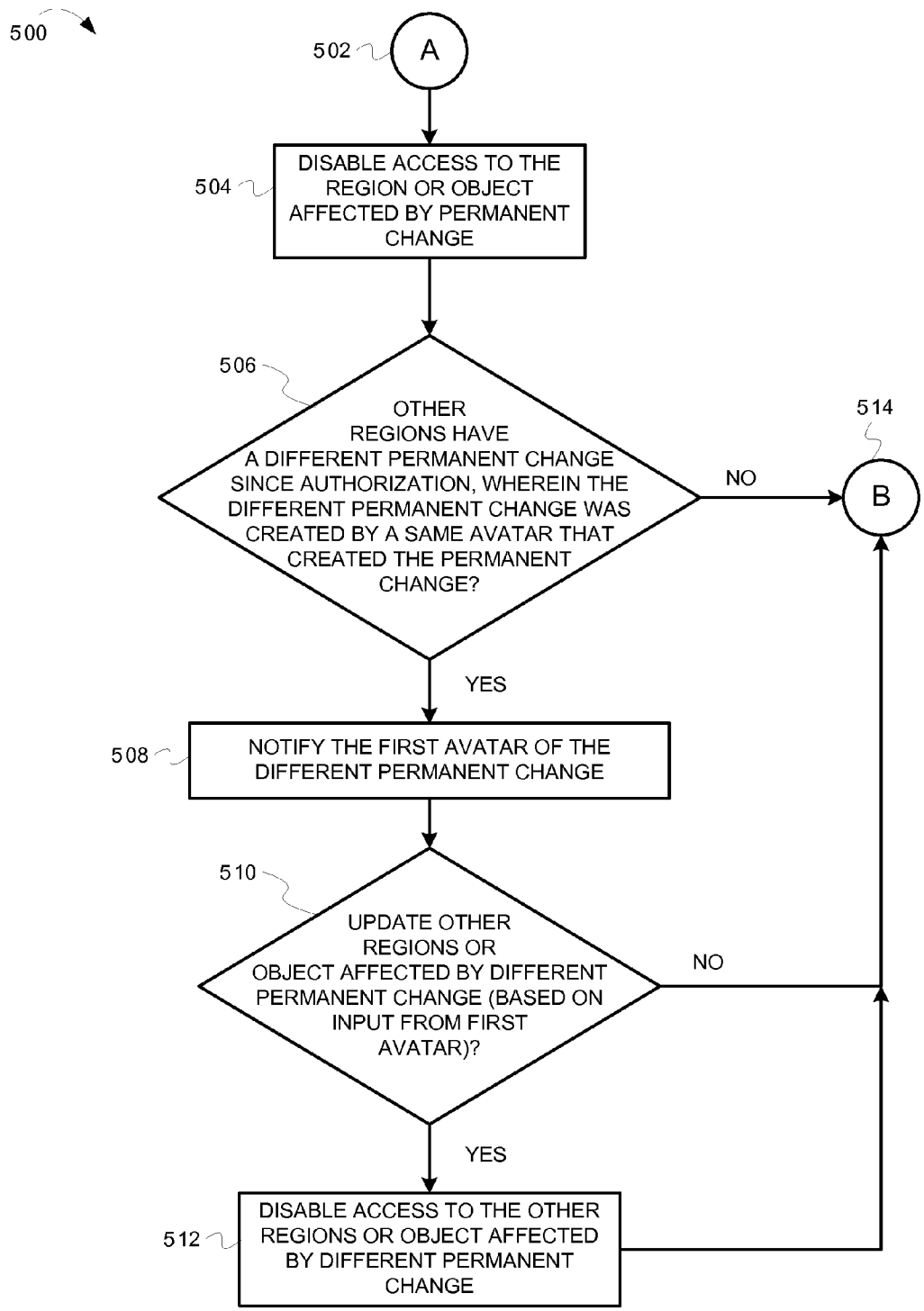

FIGS. 2 and 4-5 depict three flowcharts of operations, and FIG. 3 depicts a screenshot to help illustrate the operations therein. In particular, FIG. 2 depicts a flowchart for defining authorized regions and access to objects therein by a child's avatar based on a tracking sphere of a linked account for the parent's avatar. FIG. 3 depicts a screenshot of an example part of an online immersive environment having authorized and unauthorized regions based on a tracing sphere of the parent's avatar. FIGS. 4-5 depict flowcharts for notification of permanent changes to authorized regions to the parent's account. FIG. 2 is first described.

FIG. 2 depicts a flowchart for providing child safety in an online immersive environment, according to some example embodiments. The operations of flowchart 200 are described with reference to FIG. 1. The operations of flowchart 200 start at 202.

Track module 108 define a tracking sphere for a first avatar in an online immersive environment, wherein the tracking sphere encompasses the first avatar and some defined area beyond the first avatar (202). The first avatar represents a first person who is a guardian of a second person that is a minor in the real world and is represented by a second avatar. For example, the first person is a parent and the second person is a child of the first person in the real world. In some example embodiments, the account of the first person is linked to the second person. Also, the regions that the avatar of the second person can access in the online immersive environment can be determined by the tracking sphere of the avatar for the first person. In other words, if the tracking sphere of the avatar for the first person has touched an area, object, etc., that area, object, etc. can be accessed by the avatar for the second person.

With reference to FIG. 1, avatar 170 has a defined tracking sphere 171 around them. Based on the movement of avatar 170, an authorized region has been defined—see movement 172. Tracking sphere 171 can be defined by some x, y, and z dimension that encapsulates the parent's avatar. In such embodiments, a safe zone is defined by whatever tracing sphere 171 touches. Track module 108 can define tracing sphere 171 in terms of its size and shape as needed depending on the environment. For example, in a crowded city, tracing sphere 171 can shrink so that the safe zone is defined by a finer granularity. To illustrate, assume that the parent is walking through a video store that has an adult section in the online immersive environment. In such a situation, tracing sphere 171 can be configured to be smaller to ensure that the safe zone does not include the entire video store that includes the adult section. In another example, the parent can be walking through a park in the online immersive environment. In this situation, tracing sphere 171 can be configured to be expanded (e.g., hundreds of feet), thereby defining a greater area of a safe zone for a given traversal by the parent in the online immersive environment. A path in the online immersive environment can be defined by a collection of points or a vector. A child is allowed to walk a same relative path as the parent—not necessarily a constrained path. Otherwise, with a constrained path, the child's experience would be an instant replay of the parent's experience, rather than an immersive experience. In some example embodiments, track module 108 can define the size and shape of tracing sphere 171 based on instructions from the parent and/or automatically based on the environment. For example, the size and shape of tracing sphere 171 can decrease, become thinner, etc. as the population density, building density, etc. increases. Similarly, the size and shape of tracing sphere 171 can increase, become wider or longer, etc. as the population density, building density, etc. decreases. Operations of flowchart 200 continue 204.

Track module 108 tracks a path through the online immersive environment of the tracking sphere for the first avatar. Track module 108 can begin tracking after the first avatar has elected an option to turn on tracking Track module 108 can track the tracking sphere of the first avatar. With reference to FIG. 1, track module 108 can track the path avatar 170 that started at building 173. Tracing sphere 171 touched building 173, avatar 184 and building 180. Operations of flowchart 200 continue 206.

Track module 108 marks a region in the online immersive environment as a safe zone for the second avatar, after the path of the tracking sphere for the first avatar has traversed the region (206). With reference to FIG. 1, track module 108 can mark the region shown by movement 172 of tracing sphere 171 of avatar 170. In some example embodiments, track module 108 can store these safe zones for the second avatar in nonvolatile machine-readable media 152. Accordingly, in response to the second avatar attempting to enter regions in the online immersive environment, track module 108 can verify these regions based on these safe zones defined. To illustrate, FIG. 3 depicts a screenshot of an example part of an online immersive environment having authorized and unauthorized regions based on a tracing sphere of the parent's avatar, according to some example embodiments. Screenshot 300 includes a part of an online immersive environment after the parent's avatar has traversed a number of regions therein. Screenshot 300 includes an unauthorized region 350, wherein the child's avatar is not allowed to enter. Screenshot 300 includes three different authorized regions based on tracking of a tracking sphere of the parent avatar-authorized region 302, authorized region 304, and authorized region 306. Also, as shown, the parent avatar has excluded certain objects or regions in these authorized regions (which is described in more detail below). Excluded objects can be any type of object in the region that the parent can exclude the child from interacting with (e.g., a picture on a wall, another avatar, a specific building, a room in a building, etc.). Excluded areas can be areas in the region that the parent can exclude the child from interacting with (e.g., a city, a park in a city, a group of buildings, a building, etc.). In this example, authorized region 302 includes excluded object 310 and excluded area 312. Authorized region 304 includes excluded object 314 and excluded area 316. Authorized region 306 includes excluded area 318. As further described below, the parent avatar can define these excluded objects and excluded areas while creating the authorized regions or any time before or after. Accordingly, the linked child avatar can enter these authorized regions but cannot experience these excluded objects or areas. Returning to FIG. 3, operations of flowchart 200 continue 208.

Track module 108 authorizes access to the region marked as the safe zone for the second avatar in the online immersive environment (208). For example, track module 108 can verify the authorization to access with the parent avatar. After verification, the track module 108 can store the authorization for this region in nonvolatile machine-readable media 152. The region can be defined in terms of x, y, z coordinates, a collection of points or a vector that define the path of the tracing sphere, etc. Operations of flowchart 200 continue 210.

Track module 108 receives, from the first avatar, a notification to block access to an object in the region while continuing to authorize access to the region for the second avatar (210). With reference to FIG. 1, before, during or after avatar 170 creates the region defined by tracing sphere 171 (movement 172), the parent can find specific objects, avatars, parts of a region, etc. not suitable for the child. The parent can explicitly mark such items as inaccessible by the child. For example, the parent can exclude building 180 (even though building 180 is within the accessible region). With reference to the example of FIG. 3, the parent has excluded access to excluded object 310, excluded area 312, excluded object 314, excluded area 316 and excluded area 318 within authorized regions 302-306. Operations of flowchart 200 continue 212.

Track module 108 disables access to the object in the region by the second avatar (212). Track module 108 can update the authorized regions stored in nonvolatile machine-readable media 152 to exclude these objects, areas, etc. Accordingly, these authorized regions (and any possible excluded objects, areas, etc.) can be used to define the areas where the second avatar can traverse within the online immersive environment. Operations of flowchart 200 are complete.

Operations related to notification of permanent changes that occur in an authorized region are now described. In particular, FIGS. 4-5 depict flowcharts for notification to the parent's account of permanent changes to authorized regions, according to some example embodiments. The operations of flowchart 400 of FIG. 4 and flowchart 500 of FIG. 5 flow between each other at transition points A and B (as further described below). The operations of flowchart 400 and flowchart 500 are described with reference to FIG. 1. The operations of flowchart 400 start at 402.

Track module 108 receives a notification that a permanent change has occurred in a region (402). A permanent change can be defined as any change that remains more than a defined period (e.g., four hours, one day, one week, one month, etc.).

For example, if an area is converted from a park to a night club, the change can be considered permanent. Operations of flowchart 400 continue at 404.

Track module 108 determines whether the region is authorized for access by the second avatar based on the tracking sphere of the first avatar (404). Track module 108 can determine whether the safe zones that were defined as being accessible by the first avatar include the region where the permanent change has occurred. With reference to FIG. 1, assume that there has been a permanent change to building 173 since the first avatar (avatar 170) had authorized access based on tracing sphere 171. In such an example, the region having the permanent change would include a region authorized by the first avatar for access by the second avatar. If the region is not authorized for access by the second avatar, operations of flowchart 400 are complete. If the region is authorized for access by the second avatar, operations of flowchart 400 continue at 406.

Track module 108 determines whether the first avatar is to be notified of the permanent change (406). In some example embodiments, the parent is notified when any permanent change is made to unlocked regions. A parent can also be notified after N number of changes for a defined time period. For example, five permanent changes over a four day period would result in a notification to the parent on the fifth day. In some other example embodiments, a parent is notified if a rate of standard change of the permanent changes exceeds a threshold. The standard rate of change of permanent changes can be measured to establish a baseline of change within that region. If the number of permanent changes exceed that baseline, the parent can be notified, thereby allowing the parent to lock the region until visited, allow the region to remain unlocked, etc. For example, if a region has a baseline of two changes per day, those changes may be of little consequence to the feel or theme or a region and can be ignored. However, if one day 100 changes are made, a notification can be sent to the parent. In some example embodiments, notification of change to the parent can be based on the importance of the object that was changed. For example, interactions with objects, such as viewing, moving, inspecting, etc. are measured. An object can be considered more important the more interactions that occur for the object. In some example embodiments, a parent can be notified if an object (in an unlocked region) whose interactions exceed a threshold for a given time period changes. Also, a parent can be notified of any new object for an unlocked region. For example, if a picture on a wall is modified and there is little interaction with the picture, a notification is not sent. However, if a region contains a movie theater and the owner changes the image from a television to a projector system and there are many interactions occur relative to the movie theater, the parent is notified. If the first avatar is not to be notified, operations of flowchart 400 are complete. Otherwise, operations of flowchart 400 continue at 408.

Track module 108 notifies the first avatar of the permanent change (408). Track module 108 can notify the first avatar using any type of communications. For example, track module 108 can notify the first avatar by posting a message to their account that is part of the online immersive environment, email, text message, etc. Operations of flowchart 400 continue at 410.

Track module 108 determines whether to update the region or object affected by the permanent change (based on input from first avatar). In particular, the first avatar can be given an option to update the affected region or object. Also, track module 108 can receive some type of instruction from the account from the first avatar to perform an update. The first avatar can update the entire region, a part of the region, only the affected object, etc. If the region or object affected the permanent change is not to be updated, operations of flowchart 400 are complete. Otherwise, operations of flowchart 400 continue at transition point A 412, which continue at transition point A 502 of flowchart 500 (described below).

Operations continue at flowchart 500, which is now described. The operations of flowchart 500 start at 502. Transition point A 502 is a continuation of operations from flowchart 400 at transition point A 412.

Track module 108 disables access to the region or object affected by permanent change (504). In some example embodiments, the first avatar is given the option regarding the disabling of the access. For example, the first avatar can disable access to the entire region, part of the region that includes the object having the permanent change, the object having the permanent change, etc. To illustrate, the first avatar can disable access to an entire building that includes a picture hanging on a wall, disable access to the room that includes the picture hanging on the wall, etc. Operations of flowchart 500 continue at 506.

Track module 108 determine whether other regions have a different permanent change since authorization, wherein the different permanent change was created by a same avatar that created the permanent change (506). In particular, one avatar can perform permanent changes to different objects across multiple regions. In some example embodiments, a parent can be notified of other regions where permanent changes have occurred if the permanent changes were made by a same avatar that created a permanent change a current object in a current region that cause the parent to affect a change in authorization to the current object or current region. For example, assume that avatar A creates a permanent change to object A in region A. Assume that the parent is notified of this permanent change and in response changes access to object A or region A to prevent a child from accessing. In some example embodiments, the parent is also notified of some or all other regions where avatar A has created a permanent change to an object. This allows the parent to block access to other objects or regions based on the activity of the same avatar who created a permanent change to a current object in a current region, which cause the parent to block access to the current object or current region. If there are no other regions having a different permanent change since authorization, wherein the different permanent change was created by a same avatar that created the permanent change, operations of flowchart 500 continue at transition point B 514, which is a return to flowchart 400 at transition point B 414 wherein operations of flowchart 400 are complete. Otherwise, operations of flowchart 500 continue at 508.

Track module 108 notifies the first avatar of the different permanent change in the other regions (508). Track module 108 can notify the first avatar using any type of communications. For example, track module 108 can notify the first avatar by posting a message to their account that is part of the online immersive environment, email, text message, etc. Operations of flowchart 500 continue at 510.

Track module 108 determines whether to update other regions or object affected by the different permanent change (based on input from first avatar) (510). In particular, the first avatar can be given an option to update the affected region or object. Also, track module 108 can receive some type of instruction from the account from the first avatar to perform an update. The first avatar can update the entire region, a part of the region, only the affected object, etc. If the other regions or object affect by the different permanent change are not updated, operations of flowchart 500 continue at transition point B 514, which is a return to flowchart 400 at transition point B 414 wherein operations of flowchart 400 are complete. Otherwise, operations of flowchart 500 continue at 512.

Track module 108 disables access to the other regions or object affected by different permanent change (512). In some example embodiments, the first avatar is given the option regarding the disabling of the access. For example, the first avatar can disable access to the entire region, part of the region that includes the object having the permanent change, the object having the permanent change, etc. Operations of flowchart 500 continue at transition point B 514, which is a return to flowchart 400 at transition point B 414 wherein operations of flowchart 400 are complete. The operations of flowchart 400 and flowchart 500 are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for child safety within an online immersive environment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
defining, by a processor, a tracking area for a first avatar in an online immersive environment, wherein the tracking area encompasses the first avatar and some defined area beyond the first avatar, wherein the first avatar represents a first person who is a guardian of a second person external to the online immersive environment, wherein a second avatar represents the second person in the online immersive environment;
tracking a path through the online immersive environment of the tracking area for the first avatar;
marking a region in the online immersive environment as a safe zone for the second avatar, after the path of the tracking area for the first avatar has traversed the region; and
authorizing access to the region marked as the safe zone for the second avatar in the online immersive environment.

2. The method of claim 1, further comprising:
receiving, from the first avatar, a notification to block access to an object in the region while continuing to authorize access to the region for the second avatar; and
disabling access to the object by the second avatar.

3. The method of claim 1, wherein a size of the tracking area is variable based on a type for the region.

4. The method of claim 3, wherein the defining of the tracking area comprises decreasing a size of the tracking area as the first avatar enters regions having at least one of a greater population density and a greater building density.

5. The method of claim 3, wherein the defining of the tracking area comprises increasing a size of the tracking area as the first avatar enters regions having at least one of a lower population density and a lower building density.

6. The method of claim 1, further comprising:
notifying the first avatar of a permanent change to the region that is authorized for access after access has been authorized for the second avatar; and
disabling access to at least one of the region and an object in the region affected by the permanent change based on request by the first avatar, after the first avatar is notified of the permanent change.

7. The method of claim 6, further comprising notifying the first avatar of at least one other region where the first avatar has authorized access based on the tracking area and where a different permanent change has occurred in the at least one other region since the access was authorized and where the different permanent change was created by a same avatar that created the permanent change in the region.

8. The method of claim 7, further comprising:
responsive to notifying the first avatar of the at least one other region, receiving, from the first avatar, a change to the access to the at least one other region for the second avatar, wherein the change is to deny access to the at least one other region by the second avatar; and
disabling access to the at least one other region for the second avatar.

9. The method of claim 1, wherein a third avatar represents a third person who is a guardian of a fourth person in the real world and external to the online immersive environment, wherein the fourth avatar represents the fourth person in the online immersive environment, wherein the method comprises:
responsive to determining that a number of regions authorized by the first avatar and a number of regions authorized by the third avatar overlap by a defined threshold, authorizing access by the fourth avatar to the number of regions authorized by the first avatar.

10. A computer program product for creating authorized regions in an online immersive environment, the computer program product comprising:
 a non-transitory computer readable storage medium having computer usable program code embodied therewith, the computer usable program code comprising a computer usable program code configured to:
  define a tracking sphere for a first avatar in the online immersive environment, wherein the tracking sphere encompasses the first avatar and some defined area beyond the first avatar, wherein the first avatar represents a first person who is a guardian of a second person that is a minor in the real world and external to the online immersive environment, wherein a second avatar represents the second person in the online immersive environment;
  track a path through the online immersive environment of the tracking sphere for the first avatar;
  mark a region in the online immersive environment as a safe zone for the second avatar, after the path of the tracking sphere for the first avatar has traversed the region;
  authorize access to the region marked as the safe zone for the second avatar in the online immersive environment;
  determine a rate of change of at least one permanent change of the region that was marked;
  determine that the rate of change of the at least one permanent change of the region has been exceeded for a time period; and
  responsive to a determination that the rate of change of the at least one permanent change of the region has been exceeded for the time period, notify the first avatar of the at least one permanent change of the region.

11. The computer program product of claim 10, wherein the computer usable program code is configured to responsive to notifying the first avatar of the at least one permanent change for the time period, receive, from the first avatar, a change to the access to the region for the second avatar, the change to deny access to the region by the second avatar.

12. The computer program product of claim 10, wherein the computer usable program code is configured to disable access to at least one of the region and an object in the region affected by the at least one permanent change based on request by the first avatar, after the first avatar is notified of the at least one permanent change.

13. The computer program product of claim 12, wherein the computer usable program code is configured to notify the first avatar of at least one other region where the first avatar has authorized access based on the tracking sphere and where a different permanent change has occurred in the at least one other region since the access was authorized and where the different permanent change was created by a same avatar that created the at least one permanent change in the region.

14. The computer program product of claim 13, wherein the computer usable program code is configured to:
 responsive to notification to the first avatar of the at least one other region, receive, from the first avatar, a change to the access to the at least one other region for the second avatar, wherein the change is to deny access to the at least one other region by the second avatar; and
 disable access to the at least one other region for the second avatar.

15. A computer program product for creating authorized regions in an online immersive environment, the computer program product comprising:
 a non-transitory computer readable storage medium having computer usable program code embodied therewith, the computer usable program code comprising a computer usable program code configured to:
  define a tracking sphere for a first avatar in an online immersive environment, wherein the tracking sphere encompasses the first avatar and some defined area beyond the first avatar, wherein the first avatar represents a first person who is a guardian of a second person in the real world and external to the online immersive environment, wherein a second avatar represents the second person in the online immersive environment;
  track a path through the online immersive environment of the tracking sphere for the first avatar;
  mark a region in the online immersive environment as a safe zone for the second avatar, after the path of the tracking sphere for the first avatar has traversed the region; and
  authorize access to the region marked as the safe zone for the second avatar in the online immersive environment.

16. The computer program product of claim 15, wherein the computer usable program code is configured to:
 receiving, from the first avatar, a notification to block access to an object in the region while continuing to authorize access to the region for the second avatar; and
 disabling access to the object by the second avatar.

17. The computer program product of claim 15, wherein a size of the tracking sphere is variable based on a type for the region.

18. The computer program product of claim 17, wherein the computer usable program code configured to define the tracking sphere comprises computer usable program code configured to decrease a size of the tracking sphere as the first avatar enters regions having at least one of a greater population density and a greater building density.

19. The computer program product of claim 15, wherein the computer usable program code is configured to:
 notify the first avatar of a permanent change to the region that is authorized for access after access has been authorized for the second avatar; and
 disable access to at least one of the region and an object in the region affected by the permanent change based on request by the first avatar, after the first avatar is notified of the permanent change.

20. The computer program product of claim 19, further comprising notifying the first avatar of at least one other region where the first avatar has authorized access based on the tracking sphere and where a different permanent change has occurred in the at least one other region since the access was authorized and where the different permanent change was created by a same avatar that created the permanent change in the region.

21. The computer program product of claim 20, further comprising:
 responsive to notifying the first avatar of the at least one other region, receiving, from the first avatar, a change to the access to the at least one other region for the second avatar, wherein the change is to deny access to the at least one other region by the second avatar; and
 disabling access to the at least one other region for the second avatar.

22. An apparatus comprising:
 a processor;
 a track module executable on the processor, the track module configured to, define a tracking sphere for a first avatar in the online immersive environment, wherein the tracking sphere encompasses the first avatar and some defined area beyond the first avatar, wherein the first avatar represents a first person who is a guardian of a second person that is a minor in the real world and external to the online immersive environment, wherein a second avatar represents the second person in the online immersive environment;

track a path through the online immersive environment of the tracking sphere for the first avatar;

mark a region in the online immersive environment as a safe zone for the second avatar, after the path of the tracking sphere for the first avatar has traversed the region;

authorize access to the region marked as the safe zone for the second avatar in the online immersive environment;

determine a rate of change of at least one permanent change of the region that was marked;

determine that the rate of change of the at least one permanent change of the region has been exceeded for a time period; and responsive to a determination that the rate of change of the at least one permanent change of the region has been exceeded for the time period, notify the first avatar of the at least one permanent change of the region.

23. The apparatus of claim 22, wherein the track module is configured to responsive to notifying the first avatar of the at least one permanent change for the time period, receive, from the first avatar, a change to the access to the region for the second avatar, the change to deny access to the region by the second avatar.

24. The apparatus of claim 22, wherein the track module is configured to notify the first avatar of at least one other region where the first avatar has authorized access based on the tracking sphere and where a different permanent change has occurred in the at least one other region since the access was authorized and where the different permanent change was created by a same avatar that created the at least one permanent change in the region.

* * * * *